(12) United States Patent
Miller

(10) Patent No.: US 6,703,727 B2
(45) Date of Patent: Mar. 9, 2004

(54) NOTCHED MAGNET FOR USE IN VOICE COIL ACTUATORS

(75) Inventor: David Johnston Miller, Apex, NC (US)

(73) Assignee: Magnequench, Inc., Anderson, IN (US)

( * ) Notice: Subject to any disclaimer, the term of this patent is extended or adjusted under 35 U.S.C. 154(b) by 17 days.

(21) Appl. No.: 10/352,292

(22) Filed: Jan. 27, 2003

(65) Prior Publication Data

US 2003/0111923 A1 Jun. 19, 2003

Related U.S. Application Data

(63) Continuation of application No. 09/697,754, filed on Oct. 26, 2000, now abandoned.

(51) Int. Cl.$^7$ .............................................. H02K 41/00
(52) U.S. Cl. .................... 310/12; 360/264.7; 360/266.8
(58) Field of Search ........................ 369/264.7, 264.8, 369/264.9, 266.4, 266.7, 266.8; 310/12

(56) References Cited

U.S. PATENT DOCUMENTS 5,267,111 A * 11/1993 Nishimura et al. ...... 360/266.7
6,157,099 A * 12/2000 Hartman ..................... 310/13

FOREIGN PATENT DOCUMENTS

| JP | 59-113603 A | * | 6/1984 | |
| JP | 1-194850 A | * | 8/1989 | |
| JP | 2-065647 A | * | 3/1990 | |
| JP | 6-078510 A | * | 3/1994 | |
| JP | 2001069702 A | * | 3/2001 | ............ H02K/1/27 |

* cited by examiner

Primary Examiner—Karl Tamai
Assistant Examiner—Judson H. Jones
(74) Attorney, Agent, or Firm—Pennie & Edmonds LLP

(57) ABSTRACT

An improved magnet for use in voice coil actuators is disclosed. The improved magnet includes first and second ends and a top surface, which includes one or more reversed slope notches. Each reversed slope notch may be located in proximity to the ends of the magnet, and may be located such that the magnet is shaped symmetrically about its center. The reversed slope notch is generally characterized in that it includes a notch surface which slopes downward towards the associated end of the magnet. The reversed slope notch or notches minimize the drop-off of force of the voice coil actuator near the ends of the actuator's stroke. In one embodiment, the magnet is part of a linear voice coil actuator that includes a return structure enclosing a magnet and an air gap. In this embodiment, the top surface of the magnet is located adjacent the air gap, and a current-carrying coil travels through the air gap.

28 Claims, 9 Drawing Sheets

NOTCHED MAGNET FOR USE IN VOICE COIL ACTUATORS

This application is a continuation of prior application Ser. No. 09/697,754, filed Oct. 26, 2000, now abandoned.

TECHNICAL FIELD

This invention relates generally to voice coil actuators and, more particularly, to magnetic devices used in voice coil actuators.

BACKGROUND OF THE INVENTION

The use of voice coil actuators is well known. In common magnetic circuits of voice coil actuators, a current-carrying coil travels in the air gap and is subject to a net magnetic force. For example, in FIG. 1, a current-carrying coil 10 travels along the direction of axis X-X in the air gap 20 and is subjected to a net magnetic force by magnet 30. The force generated is proportional to the number of turns of wire in coil 10, the amount of current flowing in the wire of coil 10, and the strength of the magnetic field, in this case caused by magnet 30 in air gap 20, through which coil 10 passes. As coil 10 traverses the length of the actuator, it is desirable to maintain a uniform force, in the direction of travel, imparted on coil 10 with a constant current.

However, many actuator designs do not provide the desired uniform force characteristic. This non-uniformity may be caused by the inappropriate design of the air gap between the magnet and the return structure at the longitudinal ends of the actuator, causing the effective magnetic field of the magnet to decrease near the magnet's ends. For example, as shown in the typical voice coil actuator of FIG. 2, a magnet 30 is enclosed by a return structure 50 such that there is an air gap 20. The lack of an appropriately designed air gap causes flux lines 70 of magnet 30 near the ends of the magnet to "short," that is, to turn towards the ends (first return structure end 52 and second return structure end 54) of return structure 50 rather than to travel completely across air gap 20. This effect causes a significant drop in the useful magnetic flux component of the magnet when the coil's travel nears the ends of the magnet. Since the actuator's generated force is proportional to magnetic flux and current, in constant current devices this drop-off in effective flux results in an undesirably low force at the ends of coil's travel. In current-compensated devices, the flux drop-off results in undesirably high currents being required to maintain nominal coil force at the ends of the coil's travel.

One solution known in the art is to increase the thickness of the magnet near its ends to compensate for flux-line shorting. This modifies the air gap length near the magnet ends and boosts the flux in the air gap by reducing the length of air gap across which the flux lines must travel. The thickness of the magnet may be increased in either step and/or ramp fashions. An example of a typical ramp-type solution is shown in FIG. 3, where the air gap 20 in return structure 50 has a shorter length X near the end 52 of return structure 50 due to the increased thickness Y of ramped magnet 90. It will be appreciated that in such known magnet designs, all portions of the top surface of the magnet are either horizontal (surfaces 92 and 96) or have a positive slope (surface 94) ramping upwards towards the magnet end. However, the drop-off in resultant actuator force when the coil's position nears the magnet's end is still significant in actuators having the ramp-type solution. This can be seen in the graph of FIG. 4, which shows, for a typical voice-coil actuator employing such a solution, the resultant force (F) as a function of the position of the voice coil actuator's current-carrying coil in relation to its magnet as well as the percentage variation (P) from the maximum force. It can be seen that the decrease from the maximum force exceeds 4% near the ends of the actuator's travel.

Accordingly, there is a need in the art for a voice coil actuator that can minimize the effective drop-off of its resultant force when the position of the coil nears one or both ends of the magnet.

SUMMARY OF THE INVENTION

The present invention is directed to an improved magnet for use in voice coil actuators. The magnet includes first and second ends and a top surface, the top surface including a reversed slope notch located in proximity to the first end of the magnet. The top surface may also include a second reversed slope notch located in proximity to the second end of the magnet. The magnet may further include additional reversed slope notches, positioned in proximity to either or both the first and second magnet ends. The reversed slope notch or notches may be located such that the magnet is shaped symmetrically about its center. In one embodiment, the magnet may be part of a linear voice coil actuator that includes a return structure that encloses the magnet and an air gap. The top surface of the magnet is located adjacent the air gap, and a current-carrying coil travels through the air gap.

In another embodiment, a magnet for use in a voice coil actuator includes first and second magnet ends and a top surface and a bottom surface, the top surface including a first reversed slope notch in proximity to the first magnet end. The magnet may include a second reversed slope notch in proximity to the second magnet end. The magnet may include a magnet top end surface, wherein the reversed slope notch includes first and second notch surface configured such that the angle between the end surface and the first notch surface and the angle between the end surface and the second notch surface are both greater than zero degrees. The bottom surface of the magnet may be co-planar with a horizontal plane, and the reversed slope notch of the magnet may include first and second notch surfaces, where the angle between the horizontal and the first notch surface and the angle between the horizontal and the second notch surface are both greater than zero degrees. The reversed slope notch may include first and second notch surfaces and a vertex, the first notch surface being on the side of the apex closer to the first magnet end, the second notch surface being on the side of the apex distant from the first magnet end and sloping downwards towards the first magnet end. The reversed slope notch may include first and second notch surfaces, the angle subtended by the first and second notch surfaces being acute. The magnet may include at least one additional reversed slope notch positioned near the first magnet end, and the thickness of the magnet, excluding the effect on the thickness resulting from the notches, may increase towards the first magnet end. Each additional reversed slope notch may include first and second notch surfaces associated with that notch, wherein peaks are formed by the intersection of the first and second notch surfaces of adjacent notches. The height of each of the peaks may vary inversely with the distance of each of the peaks from the first magnet end. The angle subtended by the first and second notch surfaces of each successive reversed slope notch may increase with the distance from the first magnet end.

In another embodiment, a voice coil actuator including a magnet, includes-a return structure including first and second return structure ends and a bottom portion, the return structure enclosing a magnet and an air gap; the magnet comprising: a first magnet end positioned adjacent the first return structure end; a second magnet end adjacent the second return structure end; a top surface positioned adjacent the air gap; a bottom surface positioned adjacent the bottom portion; and at least one reversed slope notch. The reversed slope notch may be formed by a first notch surface and a second notch surface, the first notch surface being substantially planar and substantially perpendicular to the horizontal, the second notch surface being substantially planar and meeting the first notch surface to subtend an angle. The voice coil actuator may firer comprise a second reversed slope notch in proximity to the second magnet end. The voice coil actuator may include a magnet top end surface, wherein the angle between the end surface and the first notch surface and the angle between the end surface and the second notch surface are both greater than zero degrees. The bottom surface of the magnet may be co-planar with a horizontal plane, and the angle between the horizontal and the first notch surface and the angle between the horizontal and the second notch surface may both be greater than zero degrees. The reversed slope notch may have a vertex where the first and second notch surfaces intersect, the first notch surface being on the side of the apex closer to the first magnet end, the second notch surface being on the side of the apex distant from the first magnet end, and the second notch surface sloping downwards towards the first magnet end. The angle subtended by the first and second notch surfaces is acute. The voice coil actuator may include at least one additional reversed slope notch positioned near the first magnet end, and the thickness of the magnet, excluding the effect on the thickness resulting from the notches, may increase towards said first magnet end. Each additional reversed slope notch may include first and second notch surfaces associated with that notch, wherein peaks are formed by the intersection of the first and second notch surfaces of adjacent notches. The height of each of the peaks may vary inversely with the distance of each of the peaks from the first magnet end. The angle subtended by the first and second notch surfaces of each successive reversed slope notch may increase with the distance from the first magnet end. The voice coil actuator may include a current-carrying coil traveling through the air gap. The voice coil actuator may be a linear voice coil actuator. The voice coil actuator may include a ramp positioned in proximity to the first magnet end.

In another embodiment, a linear voice coil actuator includes a magnet; a return structure including first and second return structure ends and a bottom portion, the return structure enclosing the magnet and an air gap; a current-carrying coil traveling through the air gap; wherein the magnet includes: a first magnet end positioned adjacent the first return structure end; a second magnet end positioned adjacent the second return structure end; a top surface positioned adjacent the air gap; a bottom surface positioned adjacent the bottom portion; a reversed slope notch formed by a first notch surface and a second notch surface, the first notch surface being substantially planar and substantially perpendicular to the horizontal, the second notch surface being substantially planar and meeting the first notch surface to subtend an angle; and a ramp positioned in proximity to the first magnet end.

In another embodiment, a magnet for use in a voice coil actuator includes first and second magnet ends and a top surface and a bottom surface, the top surface including a first reversed slope notch in proximity to the first magnet end and a second reversed slope notch in proximity to the second magnet end

BRIEF DESCRIPTION OF THE DRAWINGS

The detailed description will be better understood in conjunction with the accompanying drawings, in which like reference characters represent like elements, as follows.

DETAILED DESCRIPTION OF THE INVENTION

The magnetic device of the present invention is discussed herein with reference to an embodiment adapted to be used in linear voice coil actuators. One of ordinary skill in the art will readily understand that the invention is not limited to linear voice coil actuators, but rather finds general application for use with any voice coil actuator.

Figure 5:
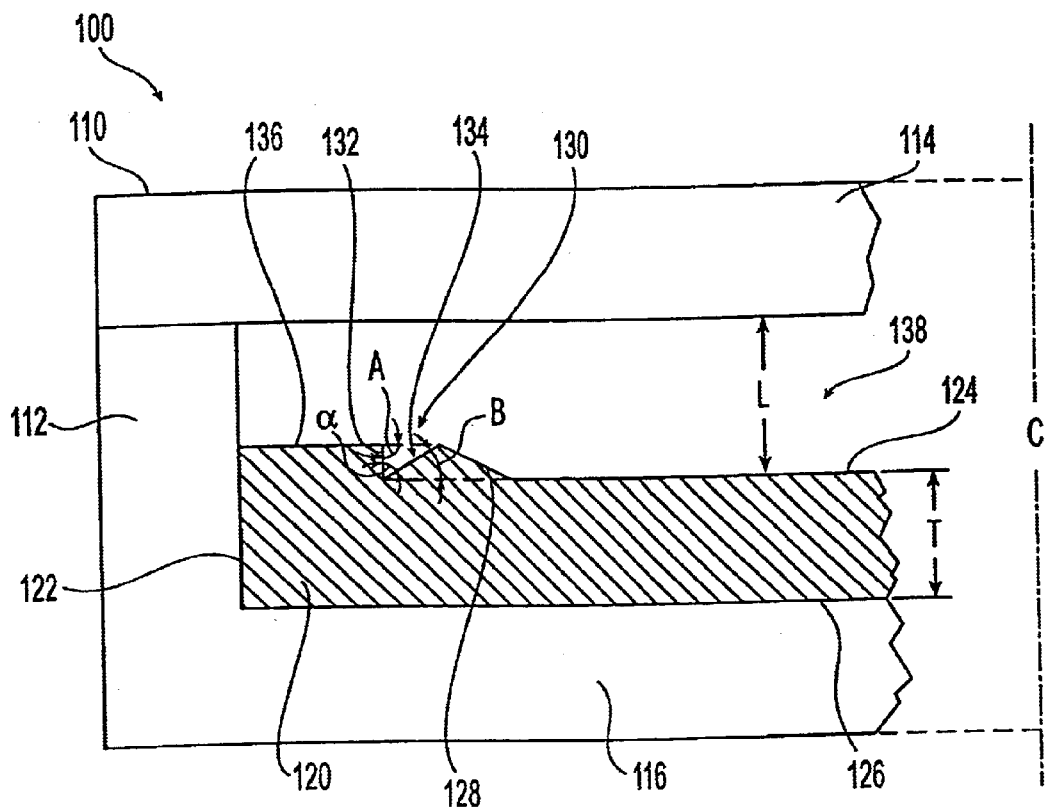
FIG. 5 is a sectional plan view of one end of part of a linear voice coil actuator including a single-notch embodiment of a magnet in accordance with the principles of the present invention.

FIG. 5 is a sectional plan view of one end of part of a linear voice coil actuator, including a single-notch embodiment of an improved magnet generally including a reversed slope notch, in accordance with the present invention. It should be understood that the end opposite first return structure end 112 of the linear voice actuator 100 (this opposite end is not shown in the FIG. 5) may be shaped and configured such that linear voice coil actuator 100 is symmetrical about its center C, if desired. However, if the advantages of improved magnet 120 are unnecessary at the opposite end, the opposite end may be shaped and configured as linear voice coil actuators known in the art, or otherwise as desired.

In the embodiment of FIG. 5, one end of linear voice coil actuator 100 includes a return structure 110 having first return structure end 112 (along with the other end not shown in FIG. 5) located near the end of the linear voice coil actuator, top portion 114, and bottom portion 116. The return structure ends, top portion, and bottom portion enclose the magnet 120 and an air gap 138. Magnet 120 includes a first magnet end 122 positioned adjacent first return structure end 112, a top surface 124 positioned adjacent air gap 138, and a bottom surface 126, which may be positioned adjacent bottom portion 116. The magnet also includes, near the end 122, a top end surface 136. As illustrated, this magnet top end surface 136 may be horizontal. As used herein, the horizontal refers to a plane co-planar with the flat bottom surface 126 of the magnet as depicted in FIG. 5. The magnet 120 may comprise any magnetic material or materials as appropriate to obtain the desired actuator performance characteristics.

Magnet 120 includes a reversed slope notch 130. In the embodiment shown in FIG. 5, the reversed slope notch 130 has a V-shape formed by a first notch surface 132 and second notch surface 134. First notch surface 132 is substantially planar and substantially perpendicular to the horizontal (as well as to the magnet top end surface 136). Also, second notch surface 134 is substantially planar and intersects first notch surface 132 to form a vertex such that the angle (α) subtended by the first notch surface 132 and second notch surface 134 is an acute angle.

More generally, however, it is not critical that the first notch surface be perpendicular to the horizontal, nor is it critical that the subtended angle of the reverse slope notch be acute. However, the reversed slope notch is characterized in that the second notch surface has a negative or downward slope (i.e., it slopes downwards towards the end of the magnet). In other words, the angle (B) between the second notch surface and the horizontal is positive. The reversed slope notch 130 is advantageously configured such that the both the angle (A) between the first notch surface 132 and the horizontal, and the angle (B) between the second notch surface 134 and the horizontal are both greater than zero degrees.

The magnet may comprise a ramp 128 in proximity to said first magnet end 122, in order to decrease the length L of the air gap near the first magnet end 122 of magnet 120. Alternatively, instead of ramp 128, a stair-step shaping of top surface 124 may be employed However, neither of these features are critical to the present invention, and a magnet of substantially constant thickness T may be used in linear voice actuator 100.

Also, it is not critical that the vertices (e.g. the vertices formed by top end surface 136 and first notch surface 132, by first notch surface 132 and second notch surface 134, by second notch surface 134 and ramp 128, and by ramp 128 and top surface 124) be single points. The vertices may be radiused surfaces that transition smoothly between their two adjacent surfaces.

Figure 6:
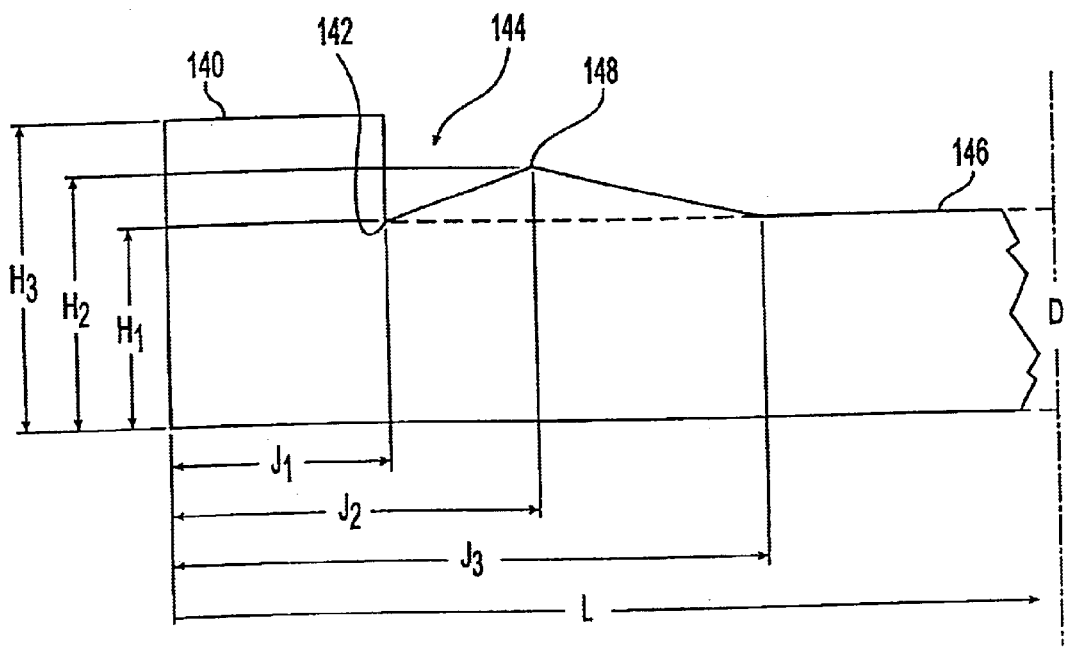
FIG. 6 is a sectional plan view of one end of one embodiment of a magnet for use in a linear voice coil actuator in accordance with the principles of the present invention.

FIG. 6 gives examples of various dimensions of the magnet of the present invention. The "H" dimensions refer to heights measured from the bottom surface of the magnet towards the top. Specifically, H3 refers to the total height of the magnet at the end. H2 refers to the top of the "peak" 148 formed by the second notch surface and the ramp. H1 refers to the thickness of the magnet at the bottom of the reversed slope notch, at vertex 142. It can be seen that in the embodiment of the FIG. 6, the thickness of the magnet towards the center D is the same as its thickness at vertex 142; however, this is not required for the present invention. The "J" dimensions refer to distances measured along the longitudinal axis of the actuator, from the end. Specifically, J1 refers to the location of vertex 142 of the reversed slope notch 144. Because the first notch surface in this embodiment is perpendicular to the top surface of the magnet, J1 is also the location of the intersection of the first notch surface with the top surface 140 of the end of the magnet; however, this perpendicularity is not required for the present invention. J2 refers to the location of the peak 148 where the second notch surface and the ramp meet, and J3 refers to the intersection of the ramp with the top surface 146 of the center portion of the magnet. L refers to the overall length of the magnet. In one specific embodiment of the magnet of the present invention, these dimensions have the following values, although the magnet of the present invention is not limited to such absolute or relative dimensions:

H1=3 millimeters (mm)
H2=3.1 mm
H3=3.3 mm
J1=2.95 mm
J2=4 mm
J3=6.95 mm
L=29.5 mm The magnet may be symmetrical about a vertical center line, such that the end of the magnet not shown in FIG. 6 would be the mirror image of the end depicted. Also, as discussed with reference to FIG. 5, the vertices, such as vertex 142 and/or peak 148, may be radiused surfaces that transition smoothly between their two adjacent surfaces.

Figure 1:
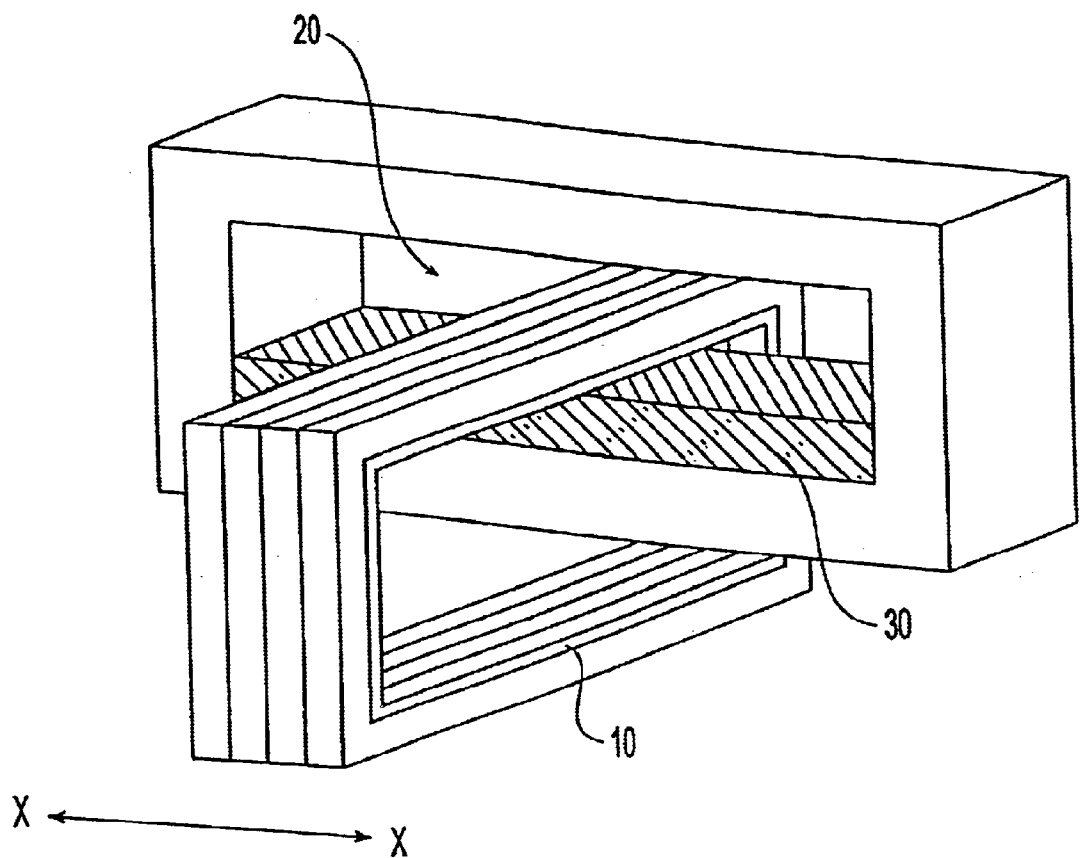
FIG. 1 is a perspective view of a linear voice coil actuator known in the art.
Figure 2:
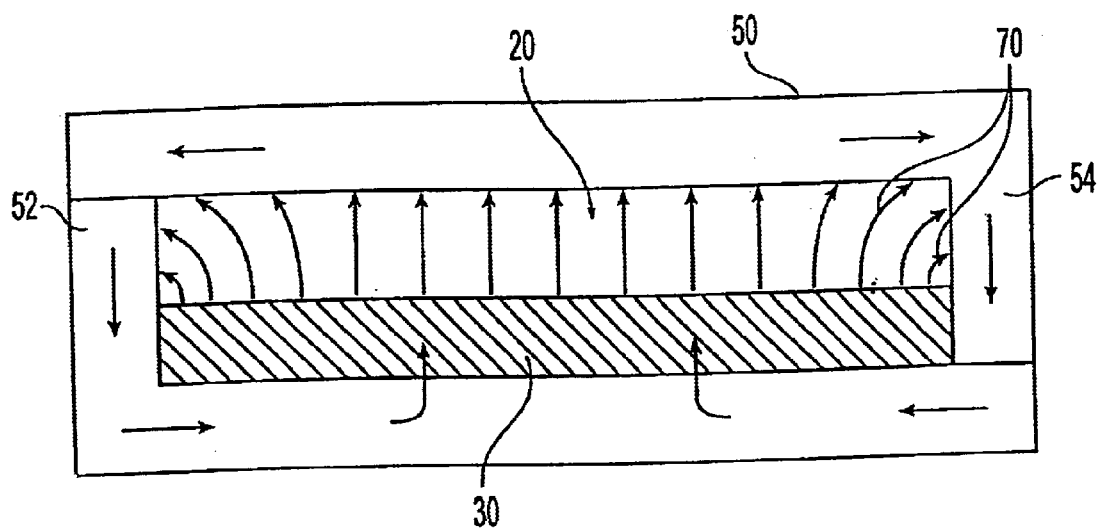
FIG. 2 is a sectional plan view of part of a linear voice coil actuator as known in the art.
Figure 3:
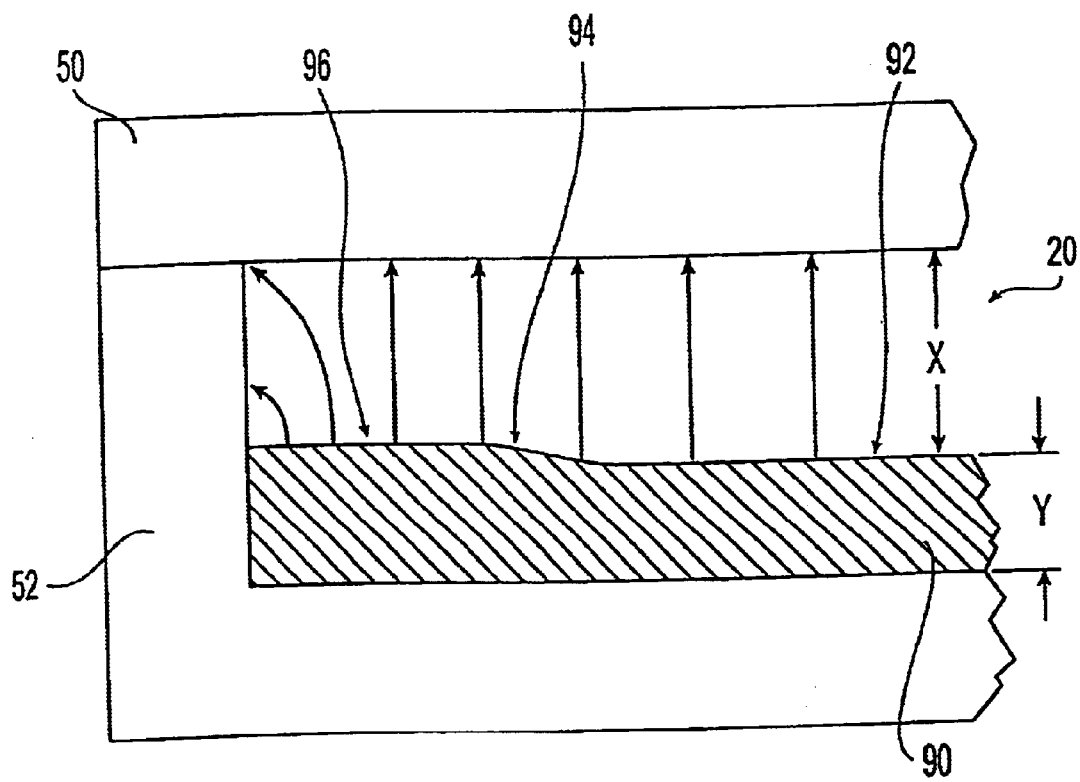
FIG. 3 is a sectional plan view of one end of part of a linear voice coil actuator that includes a ramped magnet as known in the art.
Figure 4:
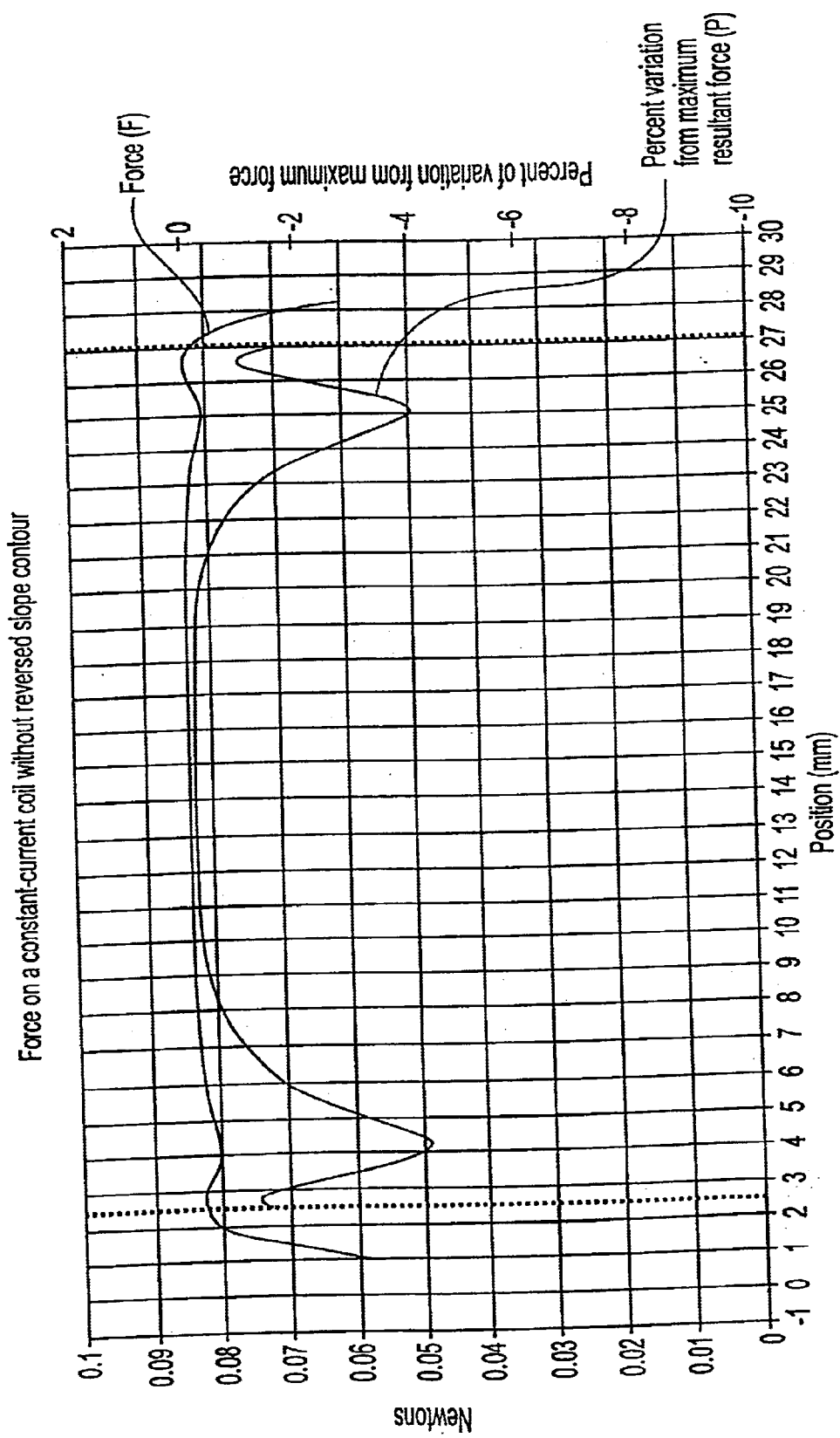
FIG. 4 is a graph showing the resultant force, on a current-carrying coil of a linear voice coil actuator that includes an embodiment of a magnet employing the ramp) type solution of FIG. 3, as a function of the position of the current-carrying coil relative to the magnet.
Figure 7:
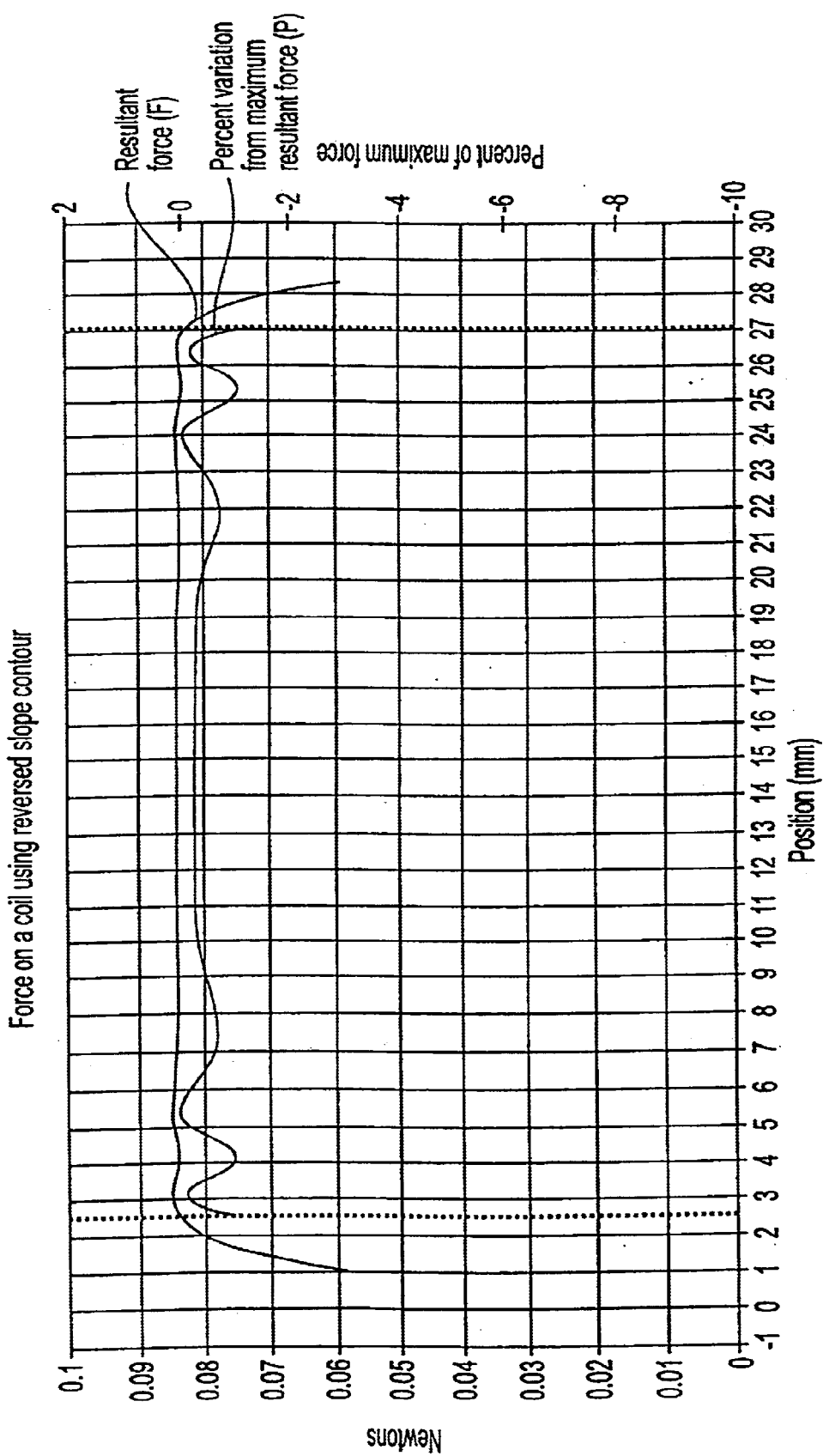
FIG. 7 is a graph showing the resultant force on a current-carrying coil of a linear voice coil actuator employing one embodiment of a magnet, such as the magnet in FIG. 5 or 6, as a function of the position of the current-carrying coil relative to the magnet.

FIG. 7 is a graph showing the force-displacement characteristics of a linear voice coil actuator including one embodiment of a magnet of the present invention, such as shown in FIG. 5 or 6. Specifically, it presents the resultant force as a function of the position of the actuator's current-carrying coil (not shown in FIG. 5 or 6) relative to the magnet. As may be seen by comparison to the graph of FIG. 4, the percentage variation, or drop-off, from the maximum resultant force of the linear voice coil actuator is decreased significantly by employment of the reversed slope notch in the magnet, the maximum variation being around 1%.

Figure 8:
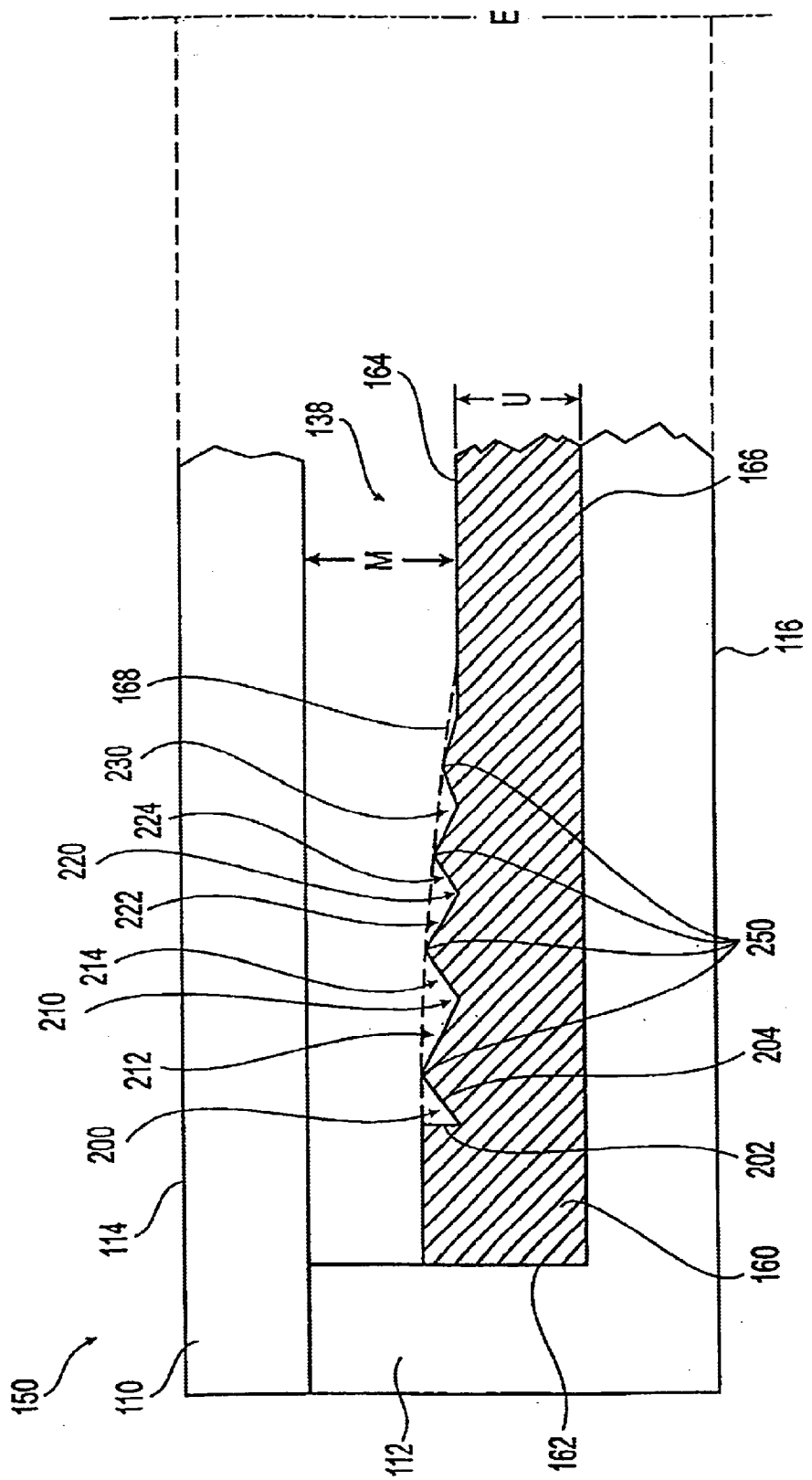
FIG. 8 is a sectional plan view of one end of a linear voice coil actuator including a multiple-notch embodiment of a magnet in accordance with the principles of the present invention.

FIG. 8 is a sectional plan view of one end of part of a linear voice coil actuator, including a multiple-notch embodiment of an improved magnet that generally includes multiple reversed slope notches, in accordance with the present invention. In this embodiment, one end of linear voice coil actuator 150 includes a return structure 110 having first return structure end 112, top portion 114, and bottom portion 116. The first return structure end 112, top portion 114, and bottom portion 116 of return structure 110 enclose magnet 160 and an air gap 138. Magnet 160 includes a first magnet end 162 positioned adjacent first return structure end 112, a top surface 164 positioned adjacent air gap 138, and a bottom surface 166 positioned adjacent bottom portion 116.

Magnet 160 of this embodiment includes multiple reversed slope notches. In this embodiment there are four reversed slope notches 200, 210, 220, and 230. Each reversed slope notch may have a V-shape formed by a first notch surface and second notch surface. As shown, the reversed slope notches when viewed together shape the top surface of the magnet in a saw-tooth configuration. The angle between the first and second notch surfaces of each successive reversed slope notch may increase with each notch, sting from the notch closest to first magnet end 162. For example, the angle between the first notch surface 212 and second notch surface 214 of reversed slope notch 210 may be greater than the angle between first notch surface 202 and second notch surface 204 of reversed slope notch 200. Similarly, the angle between the first notch surface 222 and second notch surface 224 of reversed slope notch 220 may be greater than the angle between the first notch surface and second notch surface of reversed slope notch 210. Note, however, that this pattern of increasing notch angles is not essential to the improved magnet, as the improved magnet will still achieve a substantially reduced drop-off in resultant force on a current-carrying coil without this specific pattern of notch angles.

In accordance with another advantageous aspect of the present invention, the improved magnet includes multiple reversed slope notches positioned near a magnet end such that peaks are formed by the intersection of first and second notch surfaces of different notches, with the peaks spatially closer to the magnet end being taller. This concept may be described by reference again to FIG. 8, where the magnet 160 includes four peaks 250. As shown, a given peak 250 is taller than another peak if the given peak is closer spatially to first magnet end 162, such that the thickness U of the magnet through the given peak 250 is greater than the thickness U of the peak more distant from the magnet end. Thus, the height each of the peaks 250 varies inversely with the distance of each of the peaks 250 from first magnet end 162.

The magnet prior to notching (indicated by the dotted line in FIG. 8) may comprise a ramp 168 in proximity to first magnet end 162, to decrease the length M of air gap 138 near first magnet end 162 of magnet 160. Alternatively, instead of ramp 168, a stepped solution may be employed. However, neither of these features are essential to the present invention, and a magnet of substantially constant thickness U (other than the reversed slope notches) may be used in linear voice actuator 150 in accordance with the principles of the present invention.

It should be understood that the end opposite first return structure end 112 of the linear voice actuator 150 (this end not shown in the FIG. 8) may be shaped and configured such that linear voice coil actuator 150 is symmetrical about its center E, if desired. However, if the advantages of improved magnet 160 are unnecessary at the opposite end, the opposite end may be shaped and configured as linear voice coil actuators known in the art, or otherwise as desired.

It should also be understood that the magnet shown in FIG. 8 may be altered to include either less or more than four reversed slope notches. Although the angle between the first and second notch surfaces of each reversed-slope notch of such differing embodiments may follow the same pattern as the angles described above in reference to FIG. 8, this pattern is not essential to achieve the advantages of the present invention.

Figure 9:
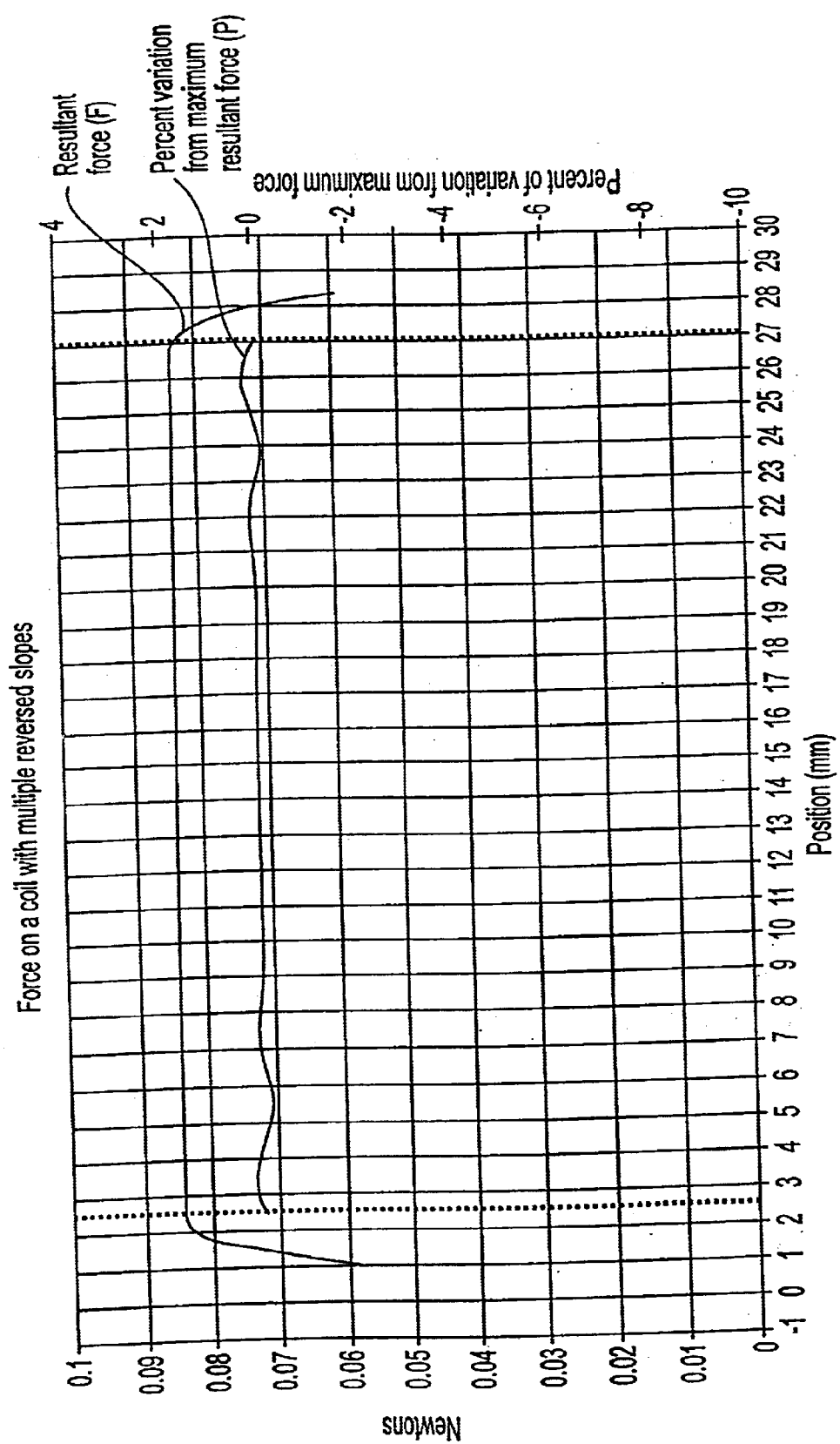
FIG. 9 is a chart showing the resultant force on a current-carrying coil of a linear voice coil actuator that includes one embodiment of the magnet, such as the magnet of FIG. 8, as a function of the position of the coil relative to the magnet.

FIG. 9 is a graph showing the force displacement characteristics of a linear voice coil actuator including one embodiment of a magnet, such as shown in FIG. 8. Specifically, FIG. 9 shows the resultant force as a function of the position of the actuator's current-carrying coil (not shown in FIG. 8) relative to the magnet. As may be seen by comparison to FIG. 4, the percentage variation, or drop-off, from the maximum resultant force of the linear voice coil actuator is decreased significantly by employment of multiple reversed slope notches in the magnet, the maximum variation being less than 0.5%. Furthermore, as shown by comparing FIG. 9 to FIG. 7, the percentage variation, or drop-off, from the maximum resultant force is reduced in the linear voice coil actuator that employs multiple reversed slope notches at its end as compared to the linear voice coil actuator employing a magnet that employs one reversed slope notch at its end.

While the foregoing description and drawings represent certain embodiments of the present invention, it will be understood that various additions, modifications, and substitutions may be made without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics of the invention. It will be appreciated that features described with respect to one embodiment typically may be applied to another embodiment) whether or not explicitly indicated. The various features described may be used singly or in any combination. The presently disclosed embodiments are therefore to be considered in all respects as illustrative and not restrictive, the scope of the invention being indicated by the appended claims, and not limited to the foregoing description.

What is claimed is:

1. A magnet for use in a voice coil actuator, comprising first and second magnet ends, a top surface and a bottom surface, the distance between said top and bottom surfaces defining a magnet height in the direction along which magnetic flux lines travel, said top surface comprising a first reversed slope notch in proximity to said first magnet end, wherein said first reversed slope notch affects the height of the magnet.

2. The magnet of claim 1, further comprising a second reversed slope notch in proximity to said second magnet end.

3. The magnet of claim 1 wherein a portion of said top surface near said magnet first end defines a magnet top end surface, and wherein said reversed slope notch comprises first and second notch surfaces configured such that the angle between said top end surface and said first notch surface and the angle between said top end surface and said second notch surface are both greater than zero degrees.

4. The magnet of claim 1 wherein said bottom surface is co-planar with a horizontal plane and said reversed slope notch comprises first and second notch surfaces, and the angle between the horizontal and said first notch surface and the angle between the horizontal and said second notch surface are both greater than zero degrees.

5. The magnet of claim 1 wherein said reversed slope notch comprises first and second notch surfaces and a vertex, said first notch surface being on the side of the apex closer to said first magnet end, said second notch surface being on the side of the apex distant from said first magnet end, and said second notch surface slopes downwards towards said first magnet end.

6. The magnet of claim 1, wherein said reversed slope notch comprises first and second notch surfaces, the angle subtended by said first and second notch surfaces being acute.

7. The magnet of claim 1, further comprising at least one additional reversed slope notch positioned near said first magnet end.

8. The magnet of claim 7, wherein the thickness of said magnet, excluding the effect on the thickness resulting from the notches, increases towards said first magnet end.

9. The magnet of claim 7, wherein each additional reversed slope notch comprises first and second notch surfaces associated with that notch, wherein peaks are formed by the intersection of said first and second notch surfaces of adjacent notches.

10. The magnet of claim 9, wherein the height of each of said peaks varies inversely with the distance of each of said peaks from said first magnet end.

11. The magnet of claim 7, wherein the angle subtended by said first and second notch surfaces of each successive reversed slope notch increases with the distance from said first magnet end.

12. A voice coil actuator including a magnet, comprising:
a return structure comprising first and second return structure ends and a bottom portion, said return structure enclosing a magnet and an air gap; said air gap having magnetic flux lines passing therethrough; and
said magnet comprising: a first magnet end positioned adjacent said first return structure end; a second magnet end adjacent to said second return structure end; a top surface positioned adjacent said air gap; a bottom surface positioned adjacent said bottom portion, the distance between said top and bottom surfaces defining a magnet height in the direction along which the magnetic flux lines travel; and at least one reversed slope notch;
wherein said first reversed slope notch affects the magnet height.

13. The voice coil actuator of claim 12 wherein said bottom surface is co-planar with a horizontal plane, and reversed slope notch is formed by a first notch surface and a second notch surface, said first notch surface being substantially planar and substantially perpendicular to the horizontal plane, said second notch surface being substantially planar and meeting said first notch surface to subtend an angle.

14. The voice coil actuator of claim 12, further comprising a second reversed slope notch in proximity to said second magnet end.

15. The voice coil actuator of claim 12 further comprising a magnet top end surface, wherein the angle between said end surface and said first notch surface and the angle between said end surface and said second notch surface are both greater than zero degrees.

16. The voice coil actuator of claim 12 wherein said bottom surface of said magnet is co-planar with a horizontal plane, and the angle between the horizontal and said first notch surface and the angle between the horizontal and second notch surface are both greater than zero degrees.

17. The voice coil actuator of claim 12 wherein said reversed slope notch of said magnet has a vertex where the first and second notch surfaces intersect, the first notch surface being on the side of the apex closer to said first magnet end, the second notch surface being on the side of the apex distant from said first magnet end, and said second notch surface slopes downwards towards said first magnet end.

18. The voice coil actuator of claim 12, wherein the angle subtended by said first and second notch surfaces is acute.

19. The voice coil actuator of claim 12, further comprising at least one additional reversed slope notch positioned near said first magnet end.

20. The voice coil actuator of claim 19, wherein the thickness of said magnet, excluding the effect on the thickness resulting from the notches, increases towards said first magnet end.

21. The voice coil actuator of claim 19, wherein each additional reversed slope notch comprises first and second notch surfaces associated with that notch, wherein peaks are formed by the intersection of said first and second notch surfaces of adjacent notches.

22. The voice coil actuator of claim 21, wherein the height of each of said peaks varies inversely with the distance of each of said peaks from said first magnet end.

23. The voice coil actuator of claim 19, wherein the angle subtended by said first and second notch surfaces of each successive reversed slope notch increases with the distance from said first magnet end.

24. The voice coil actuator of claim 12, further comprising a current-carrying coil traveling through said air gap.

25. The voice coil actuator of claim 12 wherein said voice coil actuator is a linear voice coil actuator.

26. The voice coil actuator of claim 12 further comprising a ramp positioned in proximity to said first magnet end.

27. A linear voice coil actuator, comprising:
a magnet;
a return structure comprising first and second return structure ends and a bottom portion, said return structure enclosing said magnet and an air gap; said air gap having magnetic flux lines passing therethrough; and
a current-carrying coil traveling through said air gap;
wherein said magnet comprises:
a first end positioned adjacent said first return structure end; a second magnet end positioned adjacent said second return structure end;
a top surface positioned adjacent said air gap; and a bottom surface positioned adjacent said bottom portion, the distance between said top and bottom surfaces defining a magnet height in the direction along which magnetic flux lines travel;
a ramp positioned in proximity to said first magnet end; said ramp generally effecting a steady increase in the height of the magnet towards said first magnet end; and
a reversed slope notch formed in said top surface, wherein said reversed slope notch affects the magnet height.

28. A magnet for use in a voice coil actuator, comprising first and second magnet ends and a top surface and a bottom surface, the distance between said top and bottom surfaces defining a magnet height along which magnetic flux lines travel, said top surface comprising a first reversed slope notch in proximity to said first magnet end and a second reversed slope notch in proximity to said second magnet end; wherein said reversed slope notches affect the magnet height.

* * * * *